Patented Aug. 3, 1937

2,088,829

UNITED STATES PATENT OFFICE 2,088,829

NAPHTHALENE POLYCARBOXYLIC ACID ARYLIDES AND A PROCESS FOR PREPARING THE SAME

Max Wyler and Arnold Kershaw, Blackley, Manchester, England, assignors to Imperial Chemical Industries Limited, a corporation of Great Britain No Drawing. Application June 25, 1935, Serial No. 28,373. In Great Britain July 5, 1934

5 Claims. (Cl. 260—108)

In co-pending U. S. application Serial No. 454 filed January 4, 1935, there is described the manufacture of new acenaphthene-5- and -5:6-biscarboxyalkylanilides in which alkyl is preferably methyl or ethyl and the anilide residue may carry a methyl or chloro substituent.

This invention relates to the preparation of new 1,8-dicarboxynaphthalene-4-carboxyalkylanilides or 4,5-biscarboxyalkylanilides which are obtainable by dichromate oxidation in acid solution of acenaphthene-5-carboxyalkylanilides or 5,6-biscarboxyalkylanilides.

We have now found that sodium or potassium dichromate or chromic acid in acetic acid oxidize the above compounds, without affecting the carboxyalkylanilide groups, to new compounds, which appear to be either 1:8-dicarboxynaphthalene-4-carboxyalkylanilides or -4:5-biscarboxyalkylanilides or their anhydrides. These new compounds will be spoken of as acids in this specification. They are obtained in good yield and of good purity. They are valuable intermediates for the manufacture of dyestuffs.

The following examples, in which parts are by weight, illustrate but do not limit the invention.

Example 1

To a boiling solution of 135 parts of acenaphthene-5-carboxyethylanilide in 1500 parts of glacial acetic acid are added 300 parts of sodium dichromate in portions during 2 hours, then a further 75 parts during 1½ hours. After boiling for a further half hour, the mixture is poured into 5000 parts of water, the resulting precipitate is filtered off, washed free from chromium salts, and purified by dissolving in sodium carbonate solution, filtering and reprecipitating with mineral acid. When dry it forms a yellow crystalline powder, which crystallizes from glacial acetic acid in pale yellow plates. It appears to be the anhydride; analysis N (found) 4.1%, N (calc. for anhydride) 4.06%.

Example 2

To a boiling solution of 33.6 parts of acenaphthene-5:6-biscarboxyethylanilide in 500 parts of glacial acetic acid are added 75 parts of sodium dichromate during 45 minutes. After 2 hours further boiling the mixture is diluted with 2000 parts of water and the product isolated as described in Example 1. It crystallizes from ethyl alcohol in light yellow prisms of M. P. 206° C., and appears to be the anhydride; analysis, N (found) 5.7%, N (calc. for anhydride) 5.69%.

We claim:—

1. The process for preparing new 1,8-dicarboxynaphthalene-carboxyalkylanilides which comprises subjecting to a chromic acid oxidation a compound of the formula—

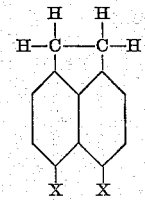

wherein one X stands for the group

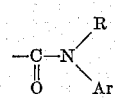

in which R stands for an alkyl radical and Ar stands for an aryl radical, and the other X stands for the same group or for hydrogen.

2. The process for preparing new 1,8-dicarboxynaphthalene carboxyalkylanilides which comprises subjecting to a chromic acid oxidation in an acetic acid medium a compound of the formula—

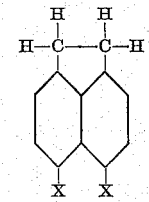

wherein one X stands for the group

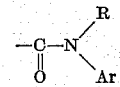

in which R stands for an alkyl radical and Ar stands for an aryl radical, and the other X stands for the same group or for hydrogen.

3. A 1,8-dicarboxylic acid compound of naphthalene-4,5-biscarboxyalkylanilide which is identical with the compound obtainable by chromic acid oxidation of acenaphthene-5,6-biscarboxyalkylanilide.

4. A 1,8-dicarboxylic acid compound of naphthalene-4-carboxyalkylanilide which is identical with the compound obtainable by chromic acid oxidation of acenaphthene-5-carboxyalkylanilide.

5. Compounds identical with those obtainable by the process of claim 2.

MAX WYLER.
ARNOLD KERSHAW.